United States Patent
Ito

(10) Patent No.: US 7,069,587 B2
(45) Date of Patent: Jun. 27, 2006

(54) ELECTRONIC DEVICE AND CONNECTION CONTROL METHOD

(75) Inventor: Takafumi Ito, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 842 days.

(21) Appl. No.: 09/934,764

(22) Filed: Aug. 23, 2001

(65) Prior Publication Data

US 2002/0026586 A1   Feb. 28, 2002

(30) Foreign Application Priority Data

Aug. 25, 2000   (JP) ............................. 2000-255840

(51) Int. Cl.
*H04L 9/32*   (2006.01)

(52) U.S. Cl. ........................................ 726/17; 713/183

(58) Field of Classification Search ............... 713/183, 713/169; 726/17
See application file for complete search history.

(56) References Cited

U.S. PATENT DOCUMENTS

| 6,170,060 B1 * | 1/2001 | Mott et al. ................ 713/201 |
| 6,257,486 B1 * | 7/2001 | Teicher et al. .............. 235/380 |

FOREIGN PATENT DOCUMENTS

EP   0 952 511 A2   10/1999

OTHER PUBLICATIONS

Haartsen, J.C., *The Bluetooth Radio System*, XP-000908653, IEEE Personal Comm., IEEE Comm. Soc., vol. 7, No. 1, pp. 28-36 (Feb. 2000).

* cited by examiner

*Primary Examiner*—Kim Vu
*Assistant Examiner*—Andrew L. Nalven
(74) *Attorney, Agent, or Firm*—Finnegan, Henderson, Farabow, Garrett & Dunner, L.L.P.

(57) ABSTRACT

A switch is provided on a device main body. When the switch is switched to a permission state, authentication by a specific identification code (PIN code) is permitted. When the switch is switched to an inhibition state, the authentication by the specific identification code is inhibited. When the switch is normally set in the inhibition state, any access from an illicit user using the specific identification code can be prevented. Additionally, when a predetermined time has elapsed after the switch is set in the permission state, the authentication by the specific identification code is inhibited. With this arrangement, even when the user forgets to return the switch that has been set in the permission state to the inhibition state, any illicit access can be prevented, and the security for the device can be ensured.

4 Claims, 15 Drawing Sheets

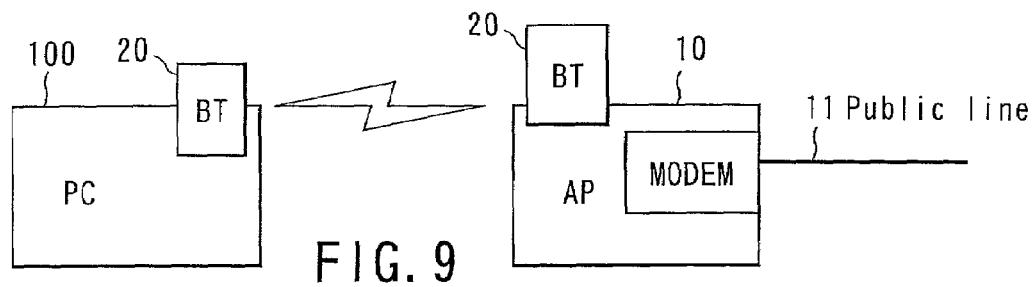
FIG. 9
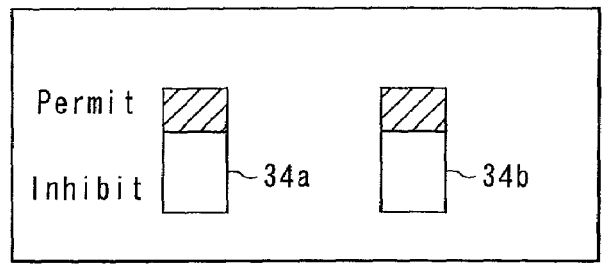
FIG. 10
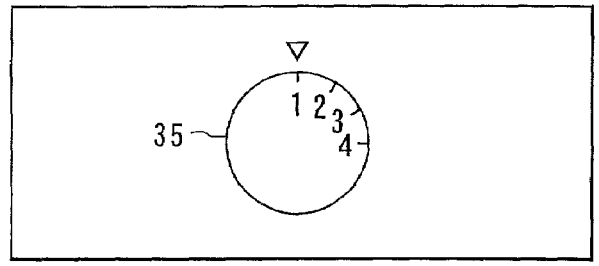
FIG. 11
FIG. 12
| SW1 | SW2 | Rotary switch |
|-----|-----|---------------|
| OFF | OFF | 1 |
| ON  | OFF | 2 |
| OFF | ON  | 3 |
| ON  | ON  | 4 |

T1

| Number | ID(Hex) | Link key | Latest connection time | Data ON/OFF flag |
|---|---|---|---|---|
| 1 | A36B35 | xxxxxx | 2000/07/20/12:00:10 | On |
| 2 | 4B3346 | xxxxxx | 2000/05/20/11:00:07 | On |
| ⋮ | ⋮ | ⋮ | | |
| N-1 | 87647A | oooooo | 2000/08/12/16:30:37 | On |
| N | — | — | | Off |

| Number | ID(Hex) | Number of times of authentication error | Latest connection time | Data ON/OFF flag |
|---|---|---|---|---|
| 1 | A36B35 | 2 | 2000/07/20/12:00:10 | On |
| 2 | 4B3346 | 5 | 2000/05/20/11:00:07 | On |
| ⋮ | ⋮ | ⋮ | | |
| M-1 | 87647A | | 2000/08/12/16:30:37 | On |
| M | — | — | | Off |

FIG. 16

ELECTRONIC DEVICE AND CONNECTION CONTROL METHOD

CROSS-REFERENCE TO RELATED APPLICATIONS

This application is based upon and claims the benefit of priority from the prior Japanese Patent Application No. 2000-255840, filed Aug. 25, 2000, the entire contents of which are incorporated herein by reference.

BACKGROUND OF THE INVENTION

1. Field of the Invention

The present invention relates to an electronic device having a radio communication function for executing data communication with another device and a connection control method.

2. Description of the Related Art

In recent years, radio communication systems in personal areas, such as the IrDA, Bluetooth, and Home RF, have received a great deal of attention. Particularly, the Bluetooth and Home RF are advantageous in omnidirectionality and high transmittance as compared to an infrared communication scheme such as the IrDA and are promising systems in the near future. The Bluetooth is a short-distance radio communication standard and realizes radio communication within the range of 10 m or 100 m using the 2.4-GHz ISM (Industrial Science Medical) band.

A radio communication system such as the Bluetooth or Home RF can simultaneously connect a plurality of devices. In addition, as one of characteristic features, the transmission distance is as long as, e.g., 10 to 100 m as compared to an infrared communication scheme such as the IrDA. Although this can improve the convenience, the user must make sure to sufficiently ensure the security and privacy of the radio communication system because the system can easily be accessed from the outside.

As a general security system for a radio communication system, a security system is known, which is used an electronic key and inhibits continuous use of a single key to improve the security, thereby increasing the safety against loss or theft.

The Bluetooth employs the following security scheme using user authentication.

User authentication in the Bluetooth is managed by a unique authentication password set in a device and an encryption key created by the authentication password and an ID (a 48-bit address issued and managed by the IEEE) unique to the device. The authentication password is called a PIN (Personal Identification Number) code and formed from an arbitrary character string. The encryption key is called a link key and also used for data encryption as well as user authentication.

Assume that a device A accesses a device B.

If the devices A and B are to be connected for the first time, the device A must input the PIN code of the device B. If it is determined that the PIN code input from the device A is correct, the device B determines that the authentication is successful and then creates a link and permits connection. At this time, the device B generates a link key of the device A by, e.g., multiplying the PIN code of its own and the ID of the device A by a random number, and stores the link key in the link key table together with the ID of the device A. To generate the link key, the ID of its own and the PIN code of the other party with which the link key is exchanged are also used.

On the other hand, if the device A is used to be connected to the device B in the past, the link key of the device A has already been registered in the link table. Hence, authentication using the link key is executed without inputting the PIN code.

There are a variety of devices using the Bluetooth. One of them is a line connection device called a modem access point. This modem access point has a public line connection function. When the communication function of the Bluetooth is added to the device, it can be connected to another Bluetooth device by radio. Hence, when the modem access point is accessed from an external device by radio, the external device can be connected to a public line to use the Internet or the like without connecting a modular cable. In this case, the above-described authentication using a PIN code or link key is done in accessing the modem access point, and only an external device for which it is determined that the authentication is successful can be connected to the modem access point.

However, if the PIN code of the modem access point is known by a person other than the authentic user by some means, that person may illicitly access the modem access point using the PIN code. For a modem access point, since the user is charged for use of a public line upon connection to the line, an illicit access poses a serious problem.

In addition, normally, a modem access point is installed at an unnoticeable place, and its power is often always ON. For this reason, the manager may not be aware of an illicit access from the outside to the modem access point.

BRIEF SUMMARY OF THE INVENTION

It is an object of the present invention to provide an electronic device and connection control method which can prevent any illicit access from other devices and ensure the security.

In order to achieve the above object, according to the present invention, there is provided an electronic device having communication unit executing authentication by a specific identification code in creating a link to another device, comprising:

a switch capable of switching between a first state and a second state;

an inhibition unit configured to inhibit the authentication by the specific identification code when the switch is set in the first state; and a permission unit configured to permit the authentication by the specific identification code when the switch is set in the second state.

According to this electronic device, when the switch capable of switching between the first state and the second state is set in the first state, the authentication by the specific identification code is inhibited. When the switch is set in the second state, the authentication by the specific identification code is permitted. For this reason, even when the user of another device knows the specific identification code, no link to the device can be created unless the switch is set in the first state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a block diagram showing the arrangement of the radio communication system;

FIG. 10 is a view showing the arrangement of slide switches provided on the access point;

FIG. 11 is a view showing the arrangement of a rotary switch provided on the access point;

FIG. 12 is a table showing the correspondence between the slide switches and the rotary switch;

FIG. 15 is a view showing the arrangement of a link table provided in the access point;

FIG. 16 is a view showing the arrangement of an authentication error table provided in the access point;

DETAILED DESCRIPTION OF THE INVENTION

The embodiment of the present invention will be described below with reference to the accompanying drawing.

Figure 1:
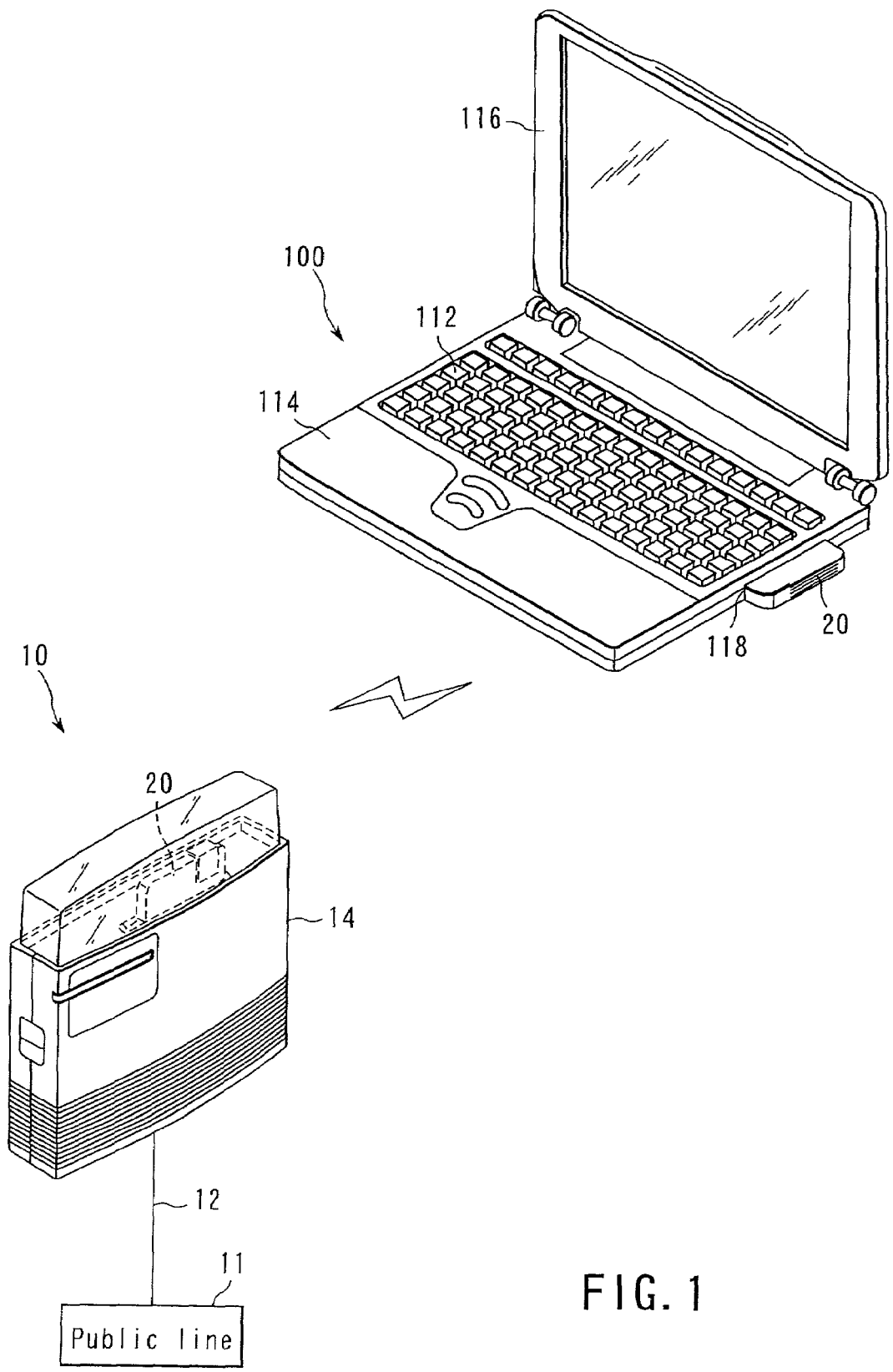
FIG. 1 is a perspective view showing the outer appearance of a radio communication system according to an embodiment of the present invention.

FIG. 1 is a perspective view showing the outer appearance of a radio communication system according to an embodiment of the present invention. FIG. 1 shows a line connection device (to be referred to as an access point hereinafter) 10 having a public line connection function and a personal computer 100 for executing radio communication with the access point 10.

A PC card (to be referred to as a BT-PC card hereinafter) 20 according to the Bluetooth radio communication standard is detachably attached to each of the access point 10 and personal computer 100. The access point 10 and personal computer 100 can execute radio data communication by attaching the BT-PC cards 20.

The personal computer 100 is used here as an external device which accesses the access point 10. A main body 114 of the personal computer 100 has a keyboard 112, liquid crystal display panel 116, and card slot 118.

The access point 10 is connected to a public line 11 through a modular cable 12 so as to transfer data transmitted from the personal computer 100 by radio to the public line 11 and also transmit data input from the public line 11 to the personal computer 100 by radio.

FIGS. 2 to 6 are views showing the arrangement of the access point 10.

Figure 2:
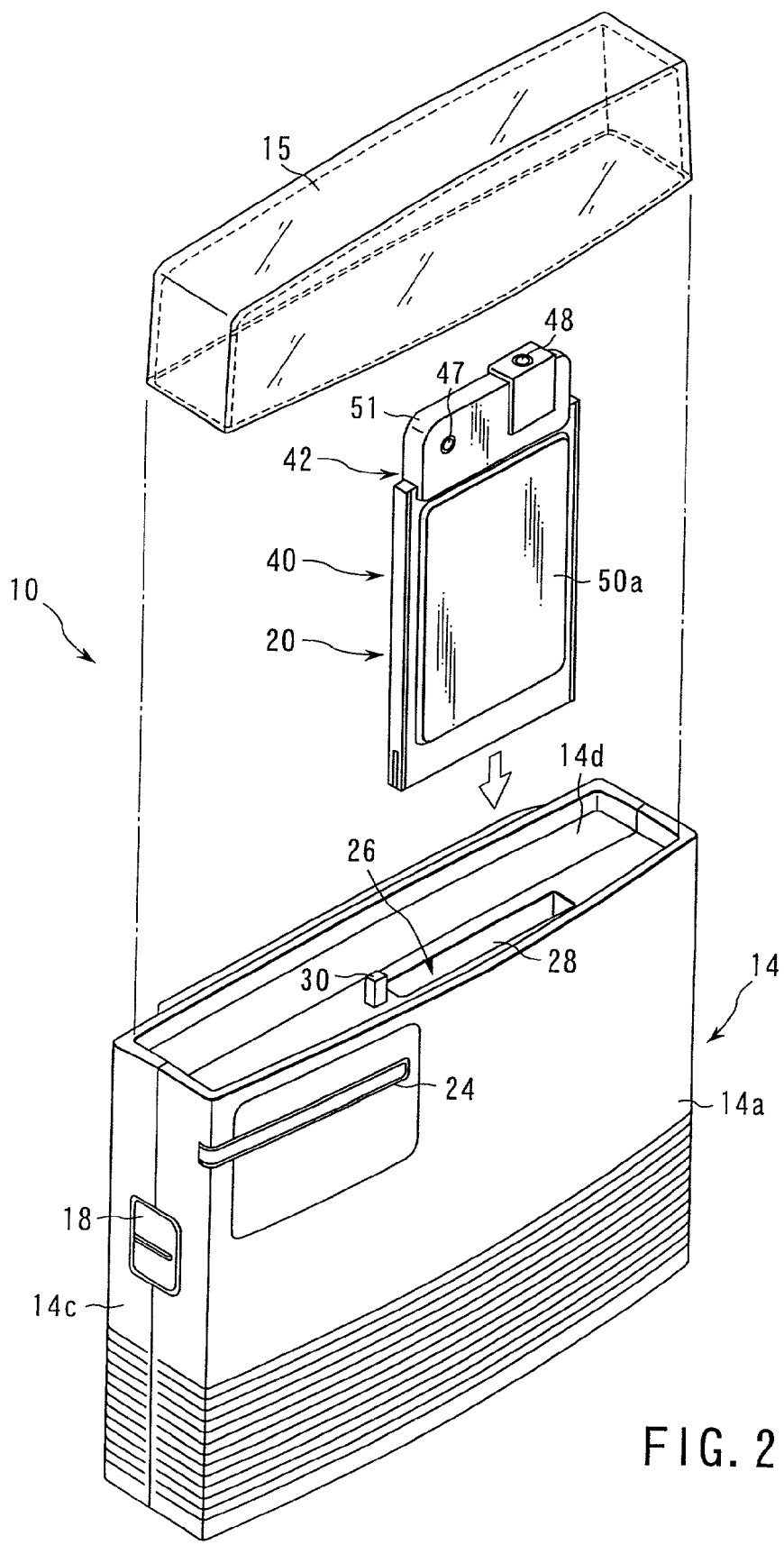
FIG. 2 is an exploded perspective view of an access point used in the radio communication system.
Figure 3:
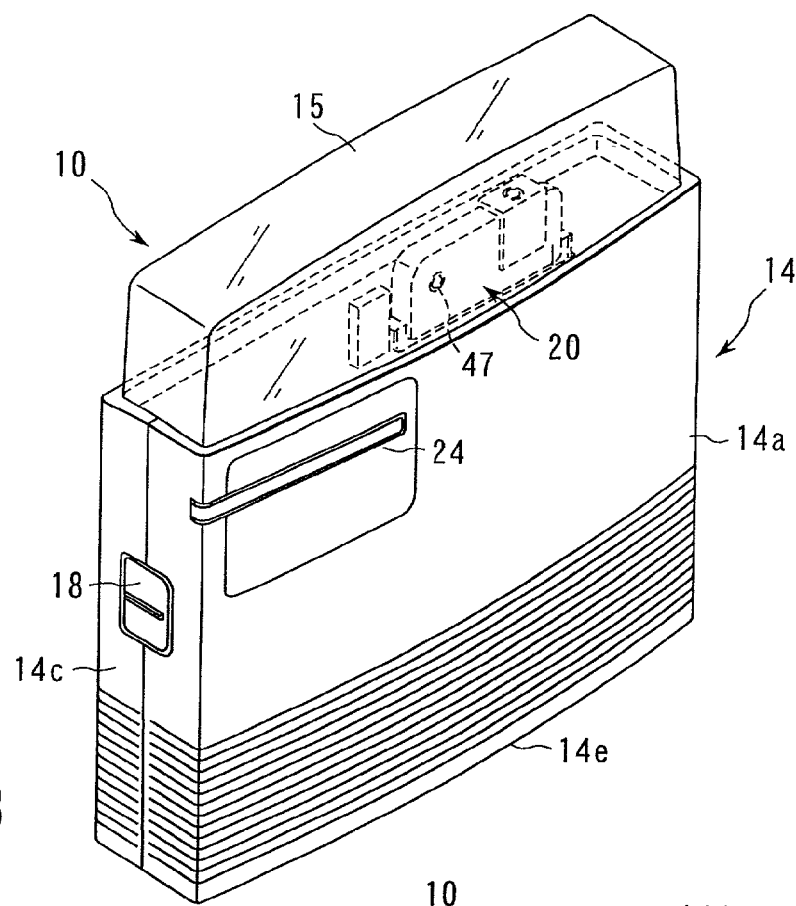
FIG. 3 is a perspective view showing a state wherein the access point is used in vertical setting.
Figure 4:
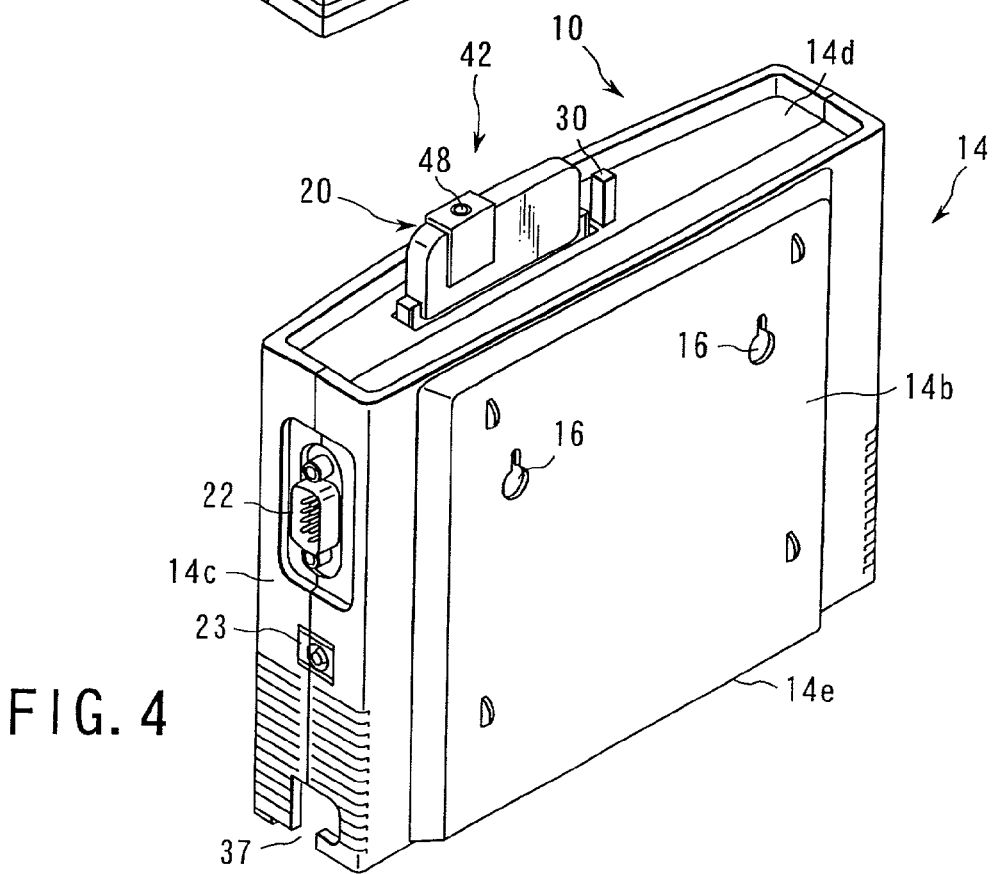
FIG. 4 is a perspective view showing the rear surface side of the access point.
Figure 5:
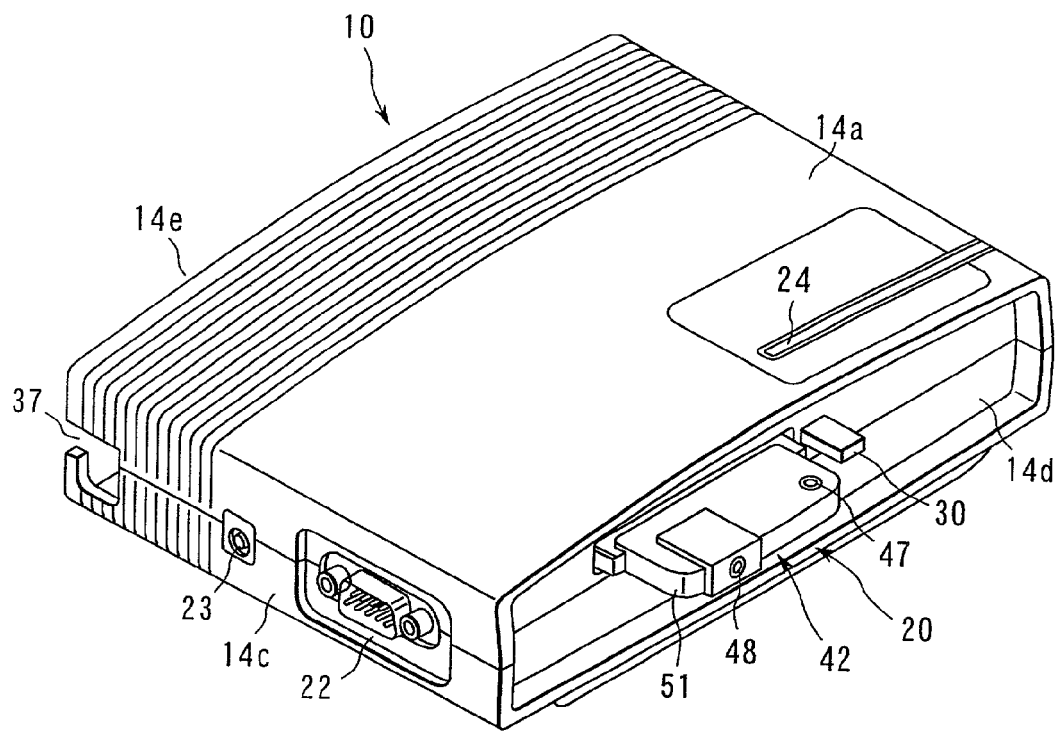
FIG. 5 is a perspective view showing a state wherein the access point is used in horizontal setting.
Figure 6:
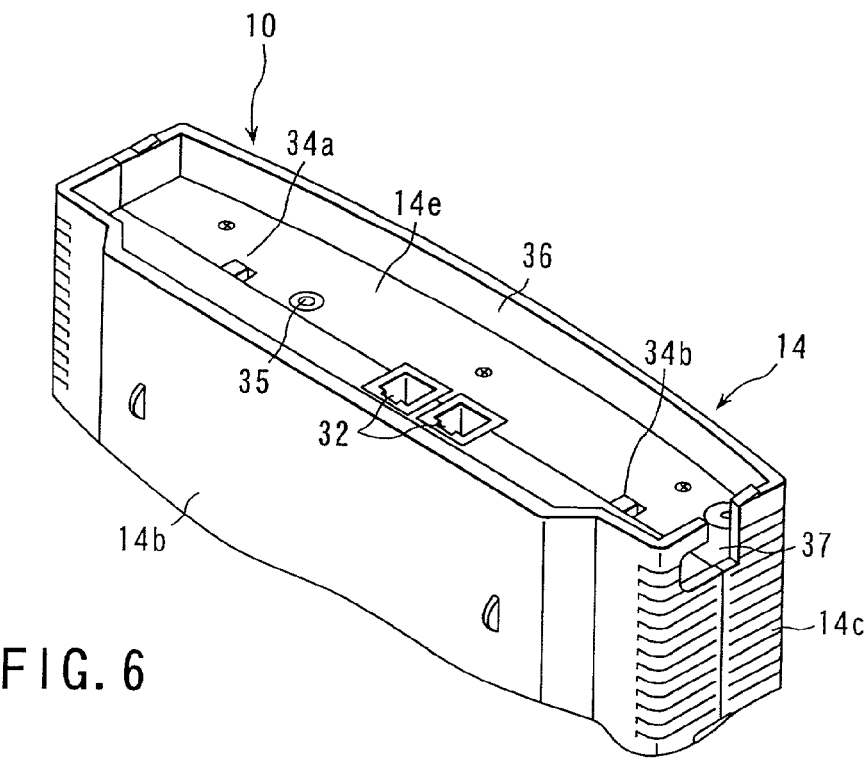
FIG. 6 is a perspective view showing the bottom surface side of the access point.

FIG. 2 is an exploded perspective view of the access point 10, FIG. 3 is a perspective view showing a state wherein the access point 10 is used in vertical setting, FIG. 4 is a perspective view showing the rear surface side of the access point 10, FIG. 5 is a perspective view showing a state wherein the access point 10 is used in horizontal setting, and FIG. 6 is a perspective view showing the bottom surface side of the access point 10.

As shown in FIGS. 2 to 6, the access point 10 has an almost rectangular device main body 14 formed from, e.g., a synthetic resin. The device main body 14 has a slightly curved front surface 14a, an almost flat rear surface 14b opposing the front surface, a pair of side surfaces 14c opposing each other, an upper surface 14d, and a bottom surface 14e. The bottom surface 14e and rear surface 14b of the device main body 14 form the first and second installation surfaces, respectively.

The access point 10 can be used by vertically setting the device main body 14 with its bottom surface 14e in contact with a desk surface or the like, as shown in FIGS. 3 and 4, or by horizontally setting the device main body 14 with its rear surface 14b in contact with a desk surface or the like, as shown in FIG. 5. The rear surface 14b has two engaging concave portions 16 to be pinned or hooked. When the engaging concave portions 16 are used, the device main body 14 can also be used as a wall-type device with its rear surface opposing a wall.

One side surface 14c of the device main body 14 has a push-button-type power switch 18. The other side surface 14c has an RS232C connector 22 and AC adapter terminal 23 to be connected to a power supply. The front surface 14a of the device main body 14 has a plurality of LEDs 24 as indicators for indicating the operation state of the access point 10. Examples of operation states to be indicated are power ON (POWER), transmission (SD), reception (RD), off-hook (OH), and the standby/active (STB/ACT) state of the BT-PC card 20 to be described below.

The upper surface 14d of the device main body 14 has a detachable transparent cover 15, a card insertion port 28 of a card slot 26, and an eject button 30. As is apparent from FIG. 6, the bottom surface 14e has two modular jacks 32 that can be connected to the modular cable 12 for connecting the access point 10 to the public line 11, a pair of left and right slide switches 34a and 34b, and a rotary switch 35.

A skirt portion 36 with a notch 37 is formed along the peripheral edge portion of the bottom surface 14e. The skirt portion 36 functions as a stand when the device main body 14 is vertically set. The modular cable 12 connected to the modular jack 32 is extracted to the outside through the notch 37. Hence, even when the device main body 14 is vertically set with the modular cable 12 connected to the modular jack 32, the device main body 14 can be stably supported by the skirt portion 36 without interfering with the modular cable 12.

The card slot 26 functioning as a holding portion is prepared in the device main body 14. The card insertion port 28 of the card slot opens to the upper surface 14d of the device main body. The BT-PC card 20 can be detachably inserted into the card slot 26 through the card insertion port 28.

The arrangement of the BT-PC card 20 will be described below.

Figure 7:
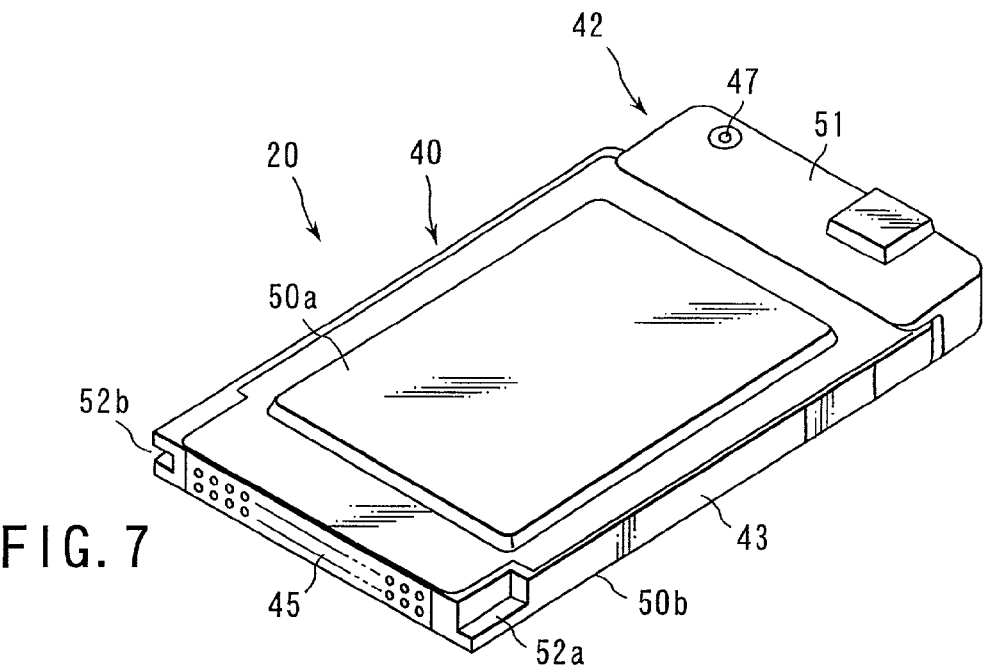
FIG. 7 is a perspective view of a BT-PC card attached to the access point.
Figure 8:
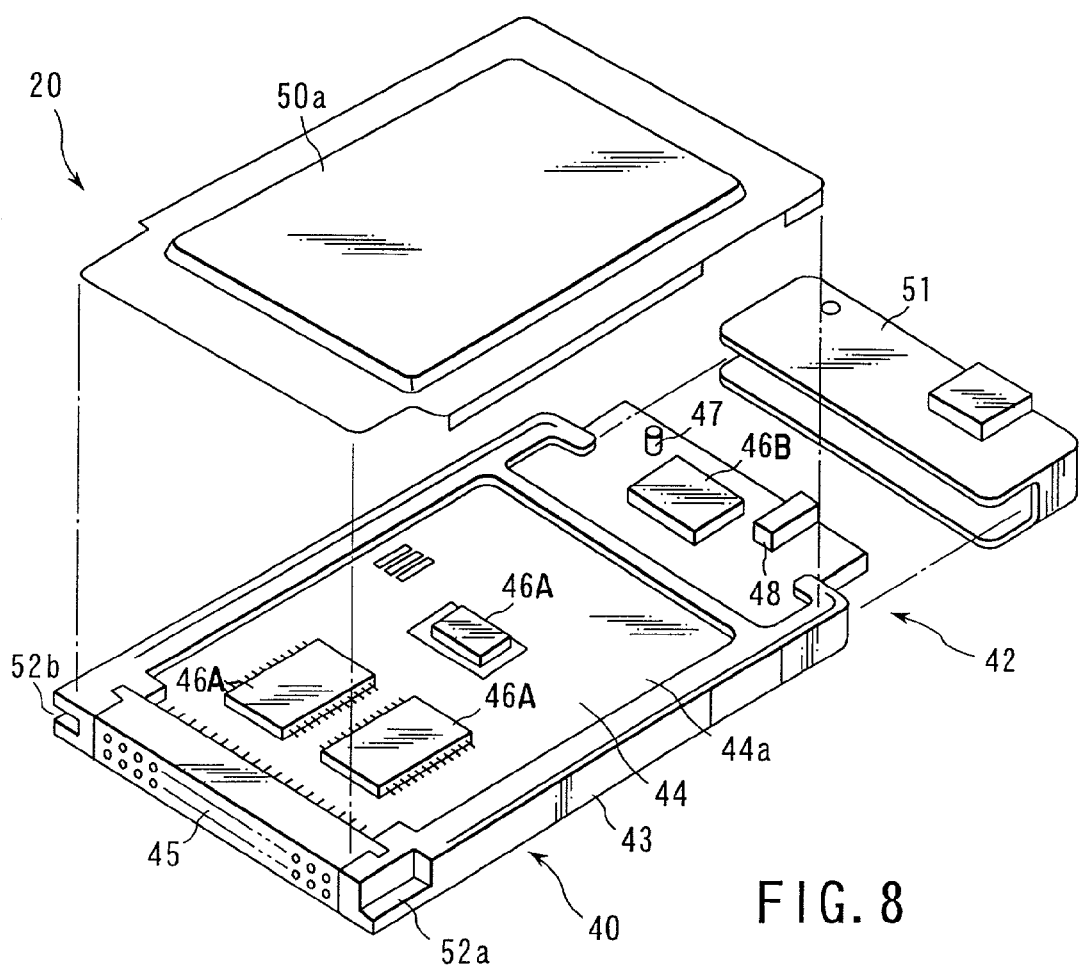
FIG. 8 is an exploded perspective view of the BT-PC card.

FIG. 7 is a perspective view of the BT-PC card 20, and FIG. 8 is an exploded perspective view of the BT-PC card 20.

As shown in FIGS. 7 and 8, the BT-PC card 20 has a card main body 40 complying with the PCMCIA standard and a transmitting/receiving section 42 complying with the BT standard and projecting for one end side of the card main body. The card main body 40 has an almost rectangular frame 43 formed from synthetic resin. The frame 43 supports the peripheral edge portion of a card board 44 in the card main body 40. A connector 45 is attached to one end of the card board 44. The other end portion of the card board projects from the card main body 40.

A plurality of electronic components 46A are mounted on one surface, i.e., an upper surface 44a of the card board 44. An antenna section 46B, an LED 47 which is turned on at the time of transmission/reception, and a headset section 48 to be connected to a headphone or microphone, all of which constitute the transmitting/receiving section 42, are arranged on the upper surface of the other end portion of the card board 44.

The upper and lower surfaces of the card board 44 are covered with a pair of metal covers 50a and 50b fitted in the frame 43, except the other end portion.

The transmitting/receiving section 42 has a cap 51 made of a synthetic resin. The cap 51 is fitted on the other end of the card main body 40 to cover the other end portion of the card board 44 and the antenna section 46B, LED 47, and headset section 48 mounted on the upper surface of the other end portion.

In the BT-PC card 20, the front end with the connector 45 is the insertion side end to the card slot 26. A first guide groove 52a opening to the upper and side surfaces and front end face of the card main body 40 is formed at one side front end of the frame 43. A second guide groove 52b opening to only the side surface and front end face of the card main body 40 is formed at the other side front end of the frame 43. The first and second guide grooves 52a and 52b regulate the directions of obverse and reverse surfaces of the BT-PC card 20 when the BT-PC card 20 is inserted into the card slot 26.

The BT-PC card 20 to be attached to the personal computer 100 has the same arrangement as described above and is attached through the card slot 118 provided on the side surface portion of the personal computer 100, as shown in FIG. 1.

When the BT-PC cards 20 having the above arrangement are attached to the access point 10 and personal computer 100, data communication according to the Bluetooth radio communication standard is possible between the access point 10 and the personal computer 100.

In accessing the access point 10 from the personal computer 100, if the access point 10 and personal computer 100 are to be connected for the first time, the personal computer 100 must input the PIN code of the access point 10. If the PIN code input from the personal computer 100 is correct, the access point 10 creates a link and permits connection. At this time, the access point 10 generates a link key on the basis of the ID of the personal computer 100 or the PIN code of its own. For the next connection request from the personal computer 100, authentication using the link key is performed.

Only a user permitted to connect is notified of the PIN code (authentication password) of the access point 10 in advance. However, if the PIN code is known by a person other than the authentic user by some means (for example, by using software dedicated to decoding), that person may illicitly access the access point 10 using the PIN code and use the public line 11 without permission.

A technique of preventing such an illicit access will be mainly described below.

FIG. 9 is a block diagram showing the arrangement of the radio communication system of the present invention in correspondence with the arrangement shown in FIG. 1 in which a radio communication system is constructed by the access point 10 and personal computer 100.

In this embodiment, the slide switches 34a and 34b are arranged at an unnoticeable place, e.g., on the lower surface of the access point 10, as shown in FIG. 10. The slide switches 34a and 34b can switch between two positions, i.e., the inhibition mode and permission mode. The slide switch 34a inhibits/permits authentication operation by a PIN code (new device registration operation). The slide switch 34b inhibits/permits security information maintenance operation (PIN code or link key change operation).

The slide switches 34a and 34b are basically operated by the manager of the access point 10. Normally, both the slide switches 34a and 34b are set in the inhibition state. To register a new device in the access point 10, the manager operates the slide switch 34a and switches it to the permission state.

The slide switch 34a is normally set in the inhibition state, and is switched to the permission state when the authentic user newly executes connection. With this arrangement, a person other than the authentic user can be prevented from inputting the PIN code of the access point 10 and making an illicit access.

Maintenance of security information stored in the access point 10, e.g., changing the PIN code of the access point 10 or deleting the link key of each device, can be executed by inputting a command from an external device (a device already registered). Maintenance of security information can be executed only when the slide switch 34b is set in the permission state. This prevents the security information in the access point 10 from being accessed and changed without permission.

The rotary switch 35 as shown in FIG. 11 may be used independently of the slide switches 34a and 34b. The rotary switch 35 can switch between at least four positions. At the first position, both the authentication operation by a PIN code (new device registration operation) and the security information maintenance operation (PIN code or link key change operation) are inhibited. At the second position, only the authentication operation by a PIN code is permitted. At the third position, only the security information maintenance operation is permitted. At the fourth position, both the authentication operation by a PIN code and the security information maintenance operation are permitted.

FIG. 12 is a table showing the correspondence between the slide switches 34a and 34b and the rotary switch 35.

Referring to FIG. 12, SW1 represents the slide switch 34a; SW2, the slide switch 34b; OFF, the inhibition state; and ON, the permission state. In addition, 1 to 4 denote the switched positions of the rotary switch 35.

When such a table representing the correspondence between the slide switches 34a and 34b and the rotary switch 35 is prepared in the access point 10, the operation state of the access point 10 can be switched by the slide switches 34a and 34b or rotary switch 35. The operation state of the access point 10 is preferably switched using the slide switches 34a and 34b because the rotary switch 35 is hard to operate as compared to the slide switches 34a and 34b. The following description will be done assuming that the operation state of the access point 10 is switched using the slide switches 34a and 34b.

Figure 13:
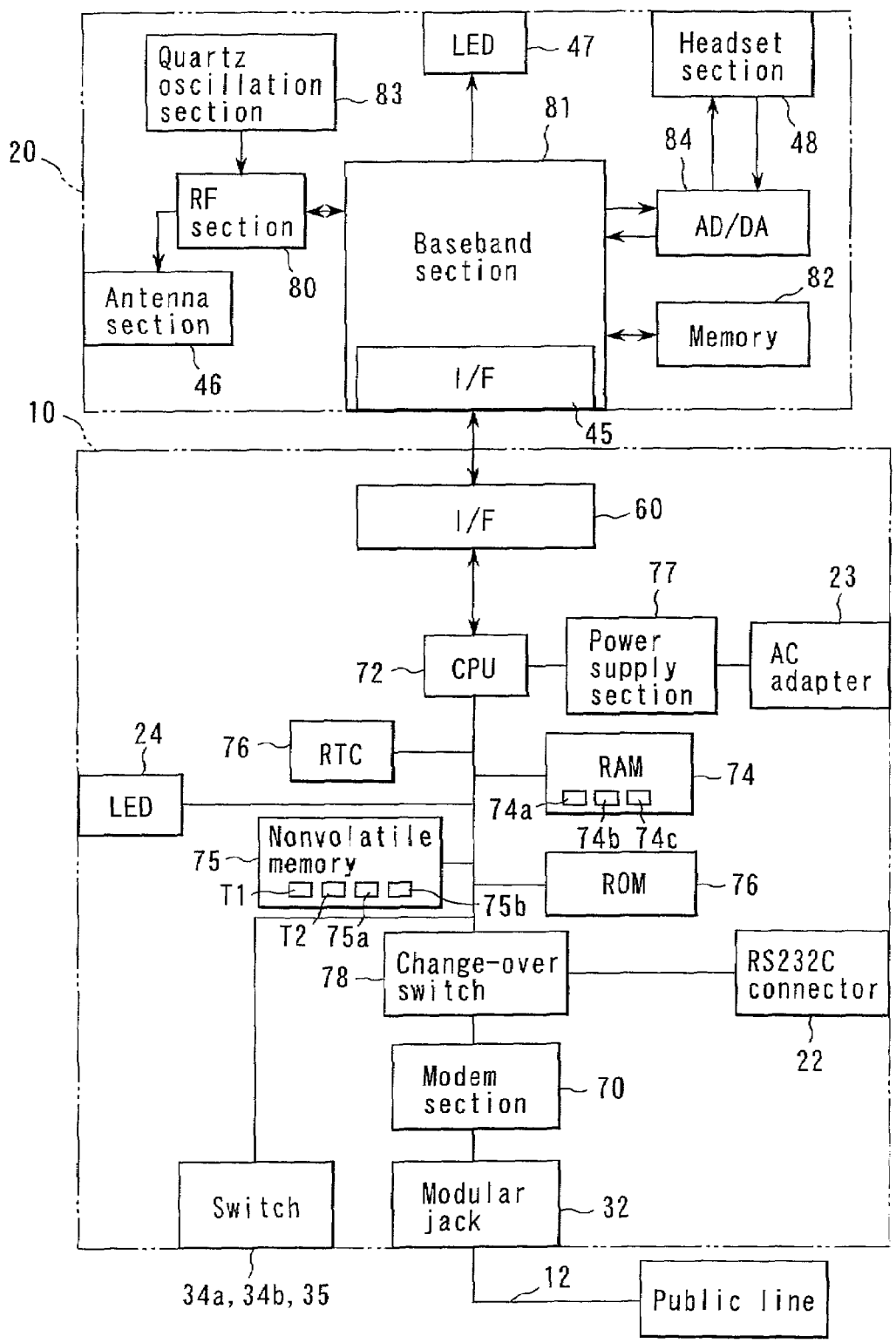
FIG. 13 is a block diagram showing the circuit arrangements of the access point and BT-PC card.

FIG. 13 is a block diagram showing the circuit arrangements of the access point 10 and BT-PC card 20.

As shown in FIG. 13, the access point 10 has a CPU 72 for controlling the operation of the entire access point. The CPU 72 is connected to the LEDs 24, switches 34a, 34b, and 35, connector 60 serving as a PC card interface, ROM 73, RAM 74, nonvolatile memory 75, RTC (Real Time Clock) circuit 76, and the like. The power supplied from the AC adapter terminal 23 is supplied to the CPU 72 through a power supply section 77.

The access point 10 also has a modem section 70 connected to the public line 11 through the modular cable 12 and modular jack 32. The modem section 70 and RS232C connector 22 are connected to the CPU 72 through a change-over switch 78. The modem section 70 and modular jack 32 function as a transmitting/receiving section.

The ROM 73 stores communication protocols for radio communication and communication with the public line 11. The RAM 74 stores driver software including the operation program of the access point 10, device driver, and radio communication protocol.

The RAM 74 has various storage sections 74a to 74c for storing the first operation control information for controlling the PIN code authentication operation, the second operation control information for controlling the security information maintenance operation, and reference time information TM.

As the nonvolatile memory 75, for example, an EEPROM is used. The nonvolatile memory 75 stores a link table T1 and authentication error table T2 (to be described below) and also has an ID storage section 75a for holding the ID of its own (registered in the BT-PC card 20) and a password storage section 75b for holding the PIN code of its own (authentication password which is arbitrarily created by the user).

The RTC circuit 76 counts the current time.

The modem section 70 converts digital data input from the BT-PC card 20 into analog data and transfers it to the public line 11 through the modular jack 32, or converts analog data input from the public line 11 through the modular jack 32 into digital data and transfers it to the CPU 72.

The RS232C connector 22 is arranged to serially connect the access point 10 to an external device such as the personal computer 100 through an RS232C cable (not shown). For example, the access point 10 can be connected to an ISDN terminal adapter through the RS232C connector 22 and RS232C cable so as to transmit digital data input from the BT-PC card 20 without any conversion.

The change-over switch 78 switches between connection to the public line 11 through the modem section 70 and modular jack 32 and connection to another electronic device through the RS232C connector 22.

The BT-PC card 20 attached to the access point 10 has, as radio modules complying with the BT standard, the antenna section 46B, RF section 80, baseband section 81, memory 82, quartz oscillation section 83, headset section 48, AD/DA conversion section 84, and LED 47.

Data transmission/reception between the BT-PC card 20 and the access point 10 is done through the connector 45. The antenna section 46B transmits or receives a radio wave to execute radio communication. The frequency band to be used is 2.4 to 2.5 GHz complying with the BT standard. The RF section 80 executes signal processing for enabling communication using a predetermined radio wave frequency.

The baseband section 81 executes digital processing for data input through the antenna section 46B and RF section 80 so as to convert the data into data processible by the access point 10, stores the data in the memory 82, and transmits the data to the access point. Assume that an ID is stored in the memory 82 in advance. Actually, an ID assigned to the BT-PC card 20 is stored in an unrewritable memory (not shown) in advance, and in attaching the BT-PC card 20, the ID of the BT-PC card 20 is written in the nonvolatile memory 75 as identification information unique to the device.

The LED 47 is turned on when, e.g., data is transmitted/received. The quartz oscillation section 83 supplies a reference wave to be used by the RF section 80. The headset section 48 is connected to a headset having a headphone and microphone so as to input/output a voice signal. The AD/DA conversion section 84 converts an analog voice signal input from the headset section 48 into digital data or converts a digital voice signal input from the access point 10 through the baseband section 81 into analog data and outputs it to the headset section 48.

Figure 14:
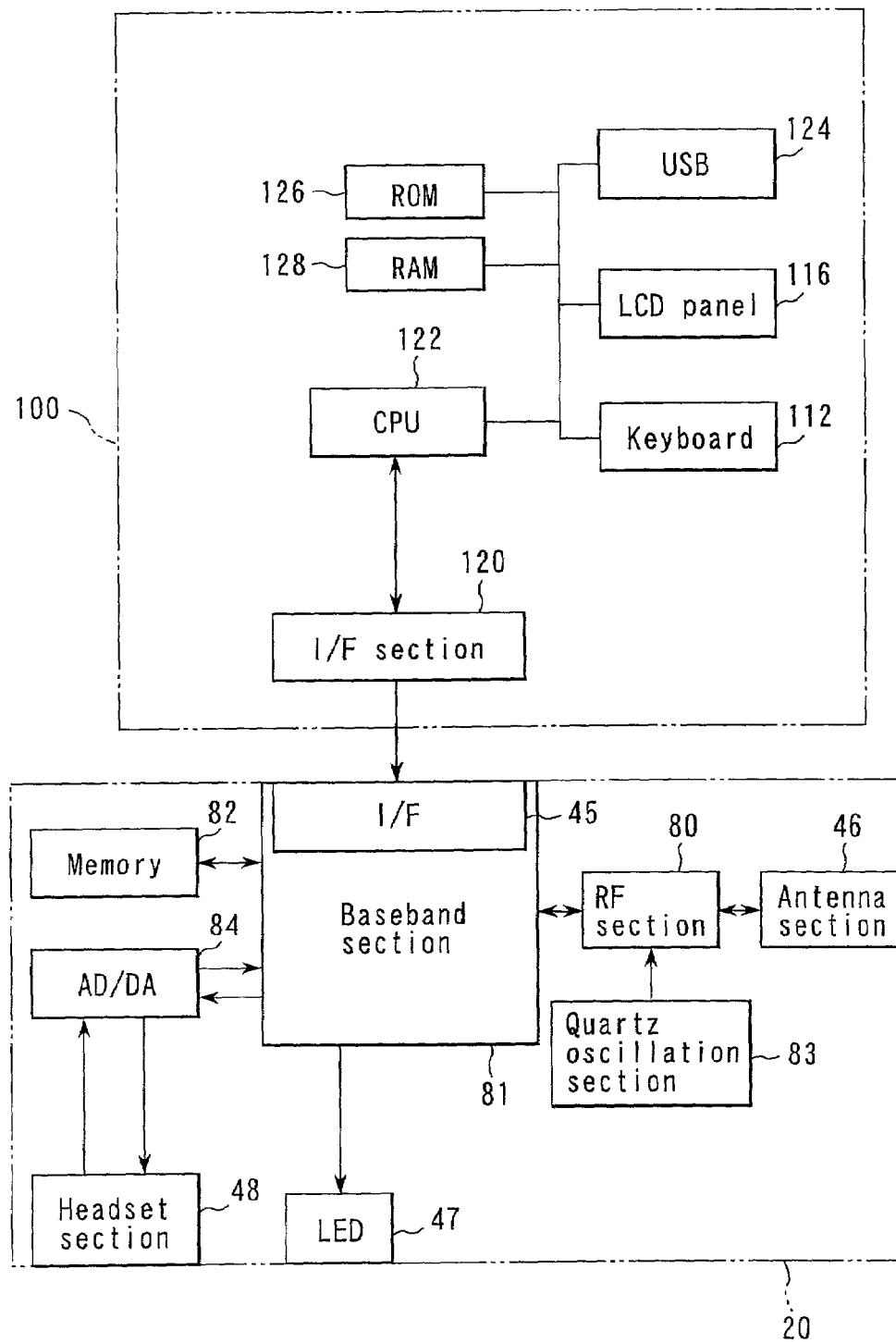
FIG. 14 is a block diagram showing the circuit arrangements of a personal computer and BT-PC card connected to the access point as an external device.

FIG. 14 is a block diagram showing the circuit arrangements of the personal computer 100 and BT-PC card 20 connected to the access point 10 as an external device.

The personal computer 100 has the main body 114 with the keyboard 112, and the liquid crystal display panel 116 provided on the main body 114 to be freely opened, as shown in FIG. 1. The main body 114 has the card slot 118, and the BT-PC card 20 is detachably inserted into the card slot 118. The card slot 118 has almost the same arrangement as that of the card slot 26 of the access point 10 described above. The BT-PC card 20 is identical to that for the access point 10 and has the same internal arrangement as that shown in FIG. 13, and a description thereof will be omitted.

The personal computer 100 has an interface connector 120 complying with the PCMCIA standard, that transmits/receives data to/from the BT-PC card 20, and a CPU 122 for controlling the operation of the entire personal computer. The CPU 122 is connected to a USB 124, ROM 126, RAM 128, and the like.

The USB 124 is used to, e.g., serially connect the access point 10 through the RS232C connector 22. The ROM 126 stores data such as a program. The RAM 128 stores various data necessary for the processing operation of the CPU 122. The RAM 128 also has various data storage sections for storing a PIN code (authentication password which is arbitrarily created by the user) set in the personal computer 100 and an ID read from the BT-PC card 20.

The arrangements of the link table T1 and authentication error table T2 managed by the access point 10 will be described below.

FIG. 15 is a view showing the arrangement of the link table T1.

In the link table T1, an ID (address) unique to each device, a link key generated on the basis of the ID and the like, a final connection time, and a data ON/OFF flag are registered.

As described above, when a connection request is received from a new device (a device unregistered in the link table T1), the access point 10 executes authentication by a PIN code. If the authentication is successful, a link key is generated on the basis of the ID of the device and the like and registered in the link table T1 together with the ID. The connection time is acquired from the RTC circuit 76 and registered in the link table T1. The connection time is updated every time the device is connected. The data ON/OFF flag represents whether data is registered in the record column.

FIG. 16 is a view showing the arrangement of the authentication error table T2.

In the authentication error table T2, an ID (address) unique to each device, the number of times of authentication error occurrence, a final connection time, and a data ON/OFF flag are registered.

For a device for which it is determined that the authentication by a PIN code fails, the access point 10 registers the ID of the device and the number of times of authentication error occurrence in the authentication error table T2 in correspondence with each other. The initial value of the number of times of authentication error occurrence is "1", which is updated every time it is determined for the device that the authentication fails. The connection time is acquired from the RTC circuit 76 and registered in the authentication error table T2. The connection time is updated every time the device is connected. The data ON/OFF flag represents whether data is registered in the record column.

The numbers of registered data in the link table T1 and authentication error table T2 are determined in accordance with the capacity of the nonvolatile memory 75. In the example shown in FIG. 15, the maximum number of registered data in the link table T1 is N. In the example shown in FIG. 16, the maximum number of registered data in the authentication error table T2 is M.

The operation of the system will be described below.

As processing operations for preventing an illicit access to the access point 10, (a) operation state switching processing by switches, (b) connection processing to external device, (c) security information maintenance processing, and (d) authentication error processing at the time of connection will be described below.

(a) Operation State Switching Processing by Switches

As described above, the slide switches 34a and 34b for switching the operation state of the access point 10 are arranged on the lower surface of the access point 10. The slide switch 34a inhibits or permits the authentication operation by a PIN code, and the slide switch 34b inhibits or permits the security information maintenance operation.

The operation state switching operation by the slide switch 34a will be described below.

Figure 17:
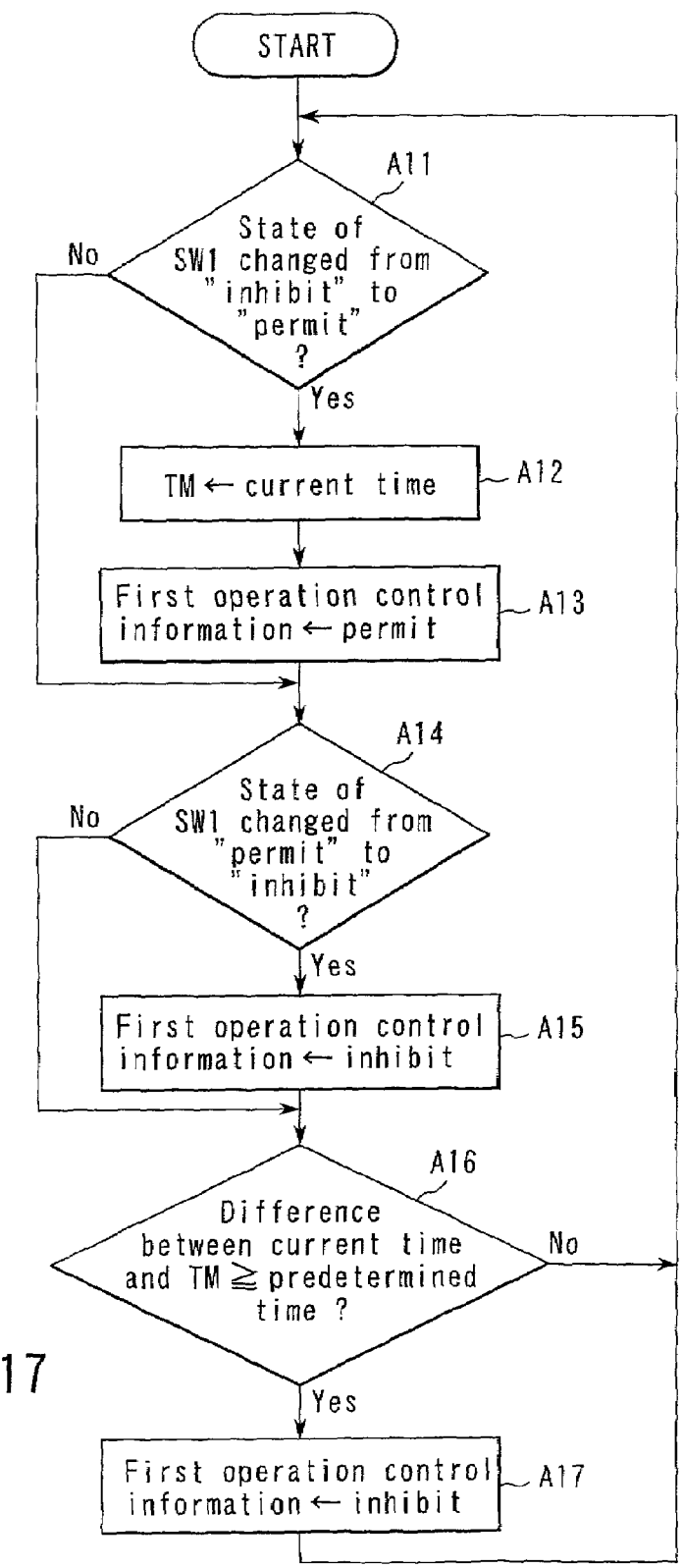
FIG. 17 is a flow chart showing operation state switching processing by the slide switch provided on the access point.

FIG. 17 is a flow chart showing operation state switching processing by the slide switch 34a provided on the access point 10. FIG. 17 shows the processing of a program executed by the CPU 72 in the access point 10. Referring to FIG. 17, SW1 means the slide switch 34a.

In the access point 10, the state of the slide switch 34a is always monitored. Upon detecting that the slide switch 34a is switched from the inhibition state to the permission state (Yes in step A11), the access point 10 acquires the current time from the RTC circuit 76 shown in FIG. 13 and sets the time in the reference time storage section 74c in the RAM 74 as the reference time information TM (step A12). Then, the first operation control information for permitting the PIN code authentication operation is set in the first operation control information storage section 74a in the RAM 74 (step A13).

On the other hand, upon detecting that the slide switch 34a is switched from the permission state to the inhibition state (Yes in step A14), the first operation control information for inhibiting the PIN code authentication operation is set in the first operation control information storage section 74a in the RAM 74 (step A15).

When the slide switch 34a is switched from the inhibition state to the permission state, and after that, the difference between the current time and the reference time information TM set upon switching is a predetermined time or more, i.e., when a predetermined time has elapsed after the slide switch 34a is switched to the permission state (Yes in step A16), the access point 10 sets the first operation control information for inhibiting the PIN code authentication operation in the first operation control information storage section 74a independently of the state of the slide switch 34a (step A17).

The above processing also applies to the slide switch 34b.

That is, when the slide switch 34b is switched from the inhibition state to the permission state, the current time is set in the reference time storage section 74c in the RAM 74 as the reference time information TM. Simultaneously, the second operation control information for permitting the security information maintenance operation is set in the second operation control information storage section 74b in the RAM 74. On the other hand, when the slide switch 34b is switched from the permission state to the inhibition state, the second operation control information for inhibiting the security information maintenance operation is set in the second operation control information storage section 74b in the RAM 74.

When the slide switch 34b is switched from the inhibition state to the permission state, and after that, the difference between the current time and the reference time information TM (different from that for managing the slide switch 34a) set upon switching is a predetermined time or more, i.e., when a predetermined time has elapsed after the slide switch 34b is switched to the permission state, the second operation control information for inhibiting the security information maintenance operation is set in the second operation control information storage section 74b in the RAM 74 independently of the state of the slide switch 34b.

The predetermined time is preferably about 10 min. However, this time may be determined in advance or arbitrarily set by the manager of the access point 10.

(b) Connection Processing to External Device

Connection processing to an external device will be described below.

Figure 18:
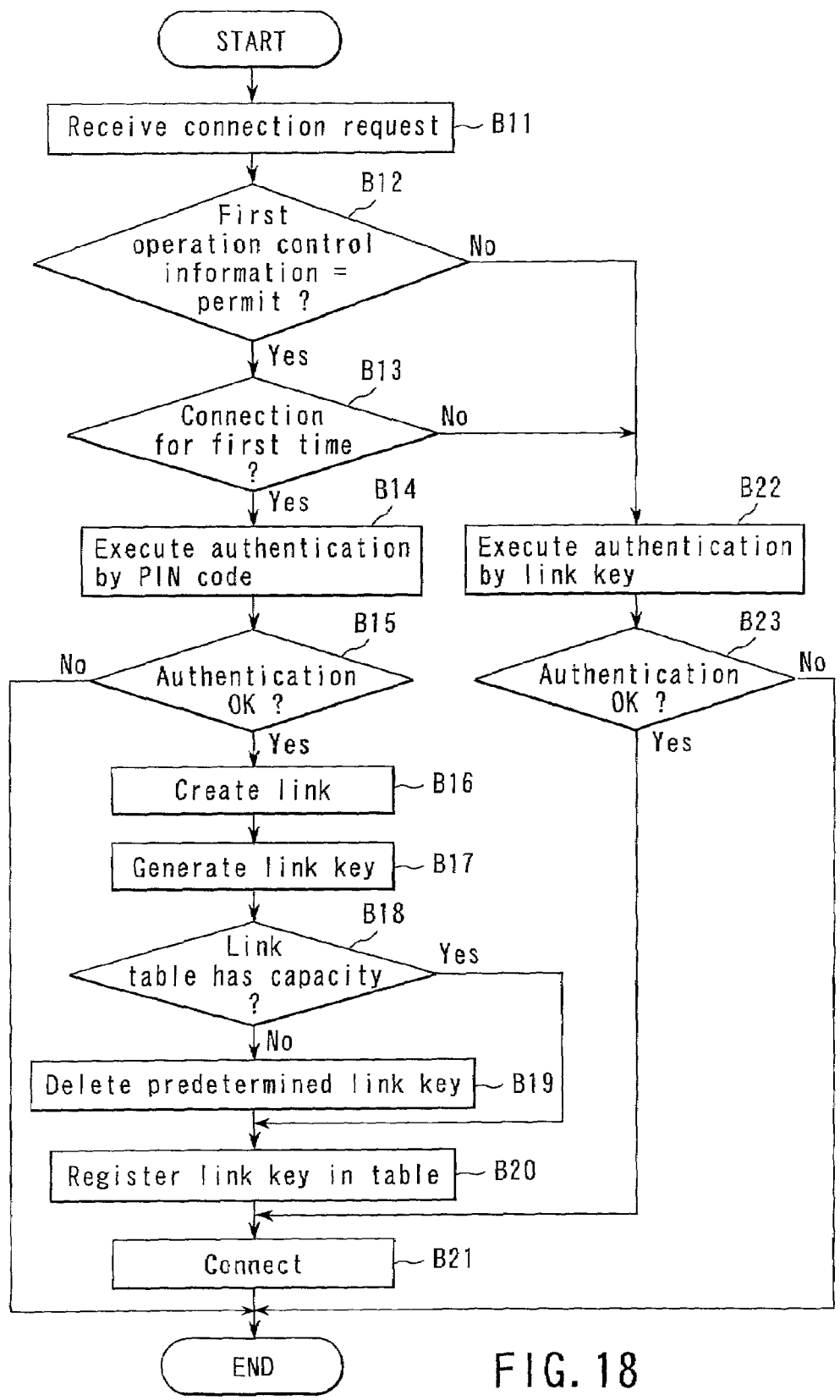
FIG. 18 is a flow chart showing connection processing to an external device in the access point.

FIG. 18 is a flow chart showing connection processing to an external device in the access point 10. FIG. 18 shows the processing of a program executed by the CPU 72 in the access point 10.

For example, when a connection request is sent from the personal computer 100 as an external device to the access point 10 by radio communication, the access point 10 checks on the basis of the first operation control information stored in the first operation control information storage section 74a in the RAM 74 whether the authentication operation by a PIN code is permitted (step B11 and B12).

As described above, if the slide switch 34a is switched to the permission state, and a predetermined time has not elapsed yet after the slide switch 34a is switched to the permission state, the first operation control information indicates permission. If the slide switch 34a is switched to the inhibition state, or a predetermined time has elapsed after the slide switch 34a is switched to the permission state, the first operation control information indicates inhibition.

If the authentication operation by a PIN code is permitted (Yes in step B12), the access point 10 checks on the basis of the presence/absence of a link key for the personal computer 100 whether the personal computer 100 that requests connection is to be connected for the first time (step B13). In the link table T1 held in the access point 10, the IDs and link keys of devices which have been connected to the access point 10 are registered. If a link key for the personal computer 100 is not present in the link table T1, i.e., if the ID of the personal computer 100 is not registered in the link table T1, it is determined that the personal computer 100 is to be connected for the first time.

If the access point 10 and personal computer 100 are to be connected for the first time (Yes in step B13), a PIN code must be input from the personal computer 100 to the access point 10.

When a PIN code is input from the personal computer 100, the access point 10 executes authentication by this PIN code (step B14). When the PIN code is correct, i.e., the PIN code matches the PIN code of the access point 10 itself, which is stored in the password storage section 75b in the nonvolatile memory 75, it is determined that the authentication is successful (Yes in step B15).

The authentication operation by a PIN code will be described below in detail with reference to FIG. 19.

Assume that a device A is to be connected to a device B. In this embodiment, the device A corresponds to the personal computer 100, and the device B corresponds to the access point 10. Referring to FIG. 19, a password indicates the PIN code of the access point 10.

Figure 19:
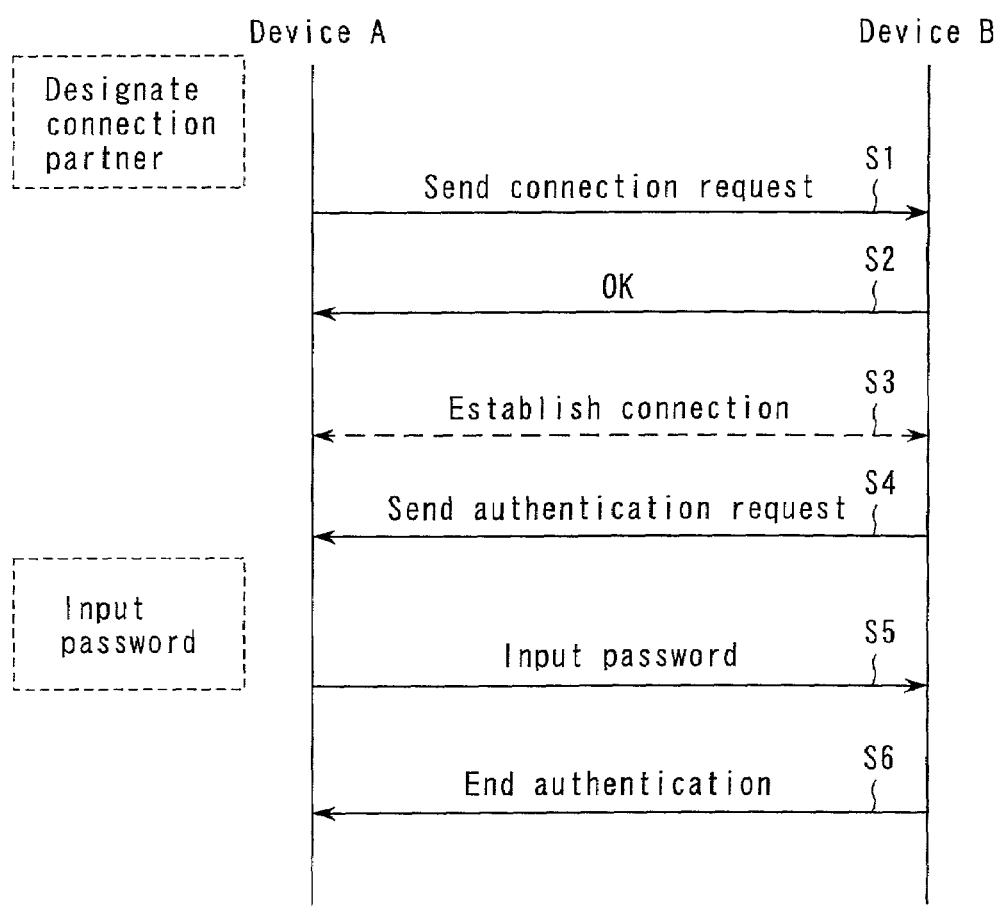
FIG. 19 is a view for explaining authentication operation by a PIN code.

As shown in FIG. 19, first, the device A transmits a connection request (step S1). Upon receiving the connection request from the device A, the device B analyzes the received data, and if it has no problem, transmits a connection establishment message to the device A (step S2). After that, connection between the devices A and B is established (step S3). In this case, the connection indicates one between the lower layers of communication. For example, it means that "a temporary network address is assigned" and does not always means the service of the upper application.

After the connection is established, an authentication procedure using a password is executed. That is, when the connection is established, the device B outputs an authentication request to the device A to prompt it to input a password (step S4). The user of the device A inputs the password of the device B and transmits the password (step S5).

Upon receiving the password, the device B collates the password of its own with the received password. If the collation fails, a message representing that the password is wrong is returned to the device A. If the collation is successful, the authentication is ended (step S6).

Referring back to FIG. 18, when the authentication operation by a PIN code is performed, and it is determined that the authentication is successful (Yes in step B15), the access point 10 creates a link (step B16) and generates a link key for the personal computer 100 (step B17). More specifically, the access point 10 acquires the ID of the personal computer 100 and multiplies the ID or the PIN code of its own by a random number generated on the access point 10 side, thereby generating a link key which is difficult to decode. If the link table T1 has no capacity (all the data ON/OFF flags are ON) (No in step B18), device data with the oldest connection time is deleted from the link table T1 (step B19). The access point 10 registers the generated link key in the link table T1 together with the ID of the personal computer 100 (step B20). At this time, the current time is acquired from the RTC circuit 76 and registered in the link table T1 as the final connection time, and the data ON/OFF flag is set to "ON".

When the link key of the newly connected device is registered in place of the link key of a device with the least possibility of connection, the PIN codes can be efficiently managed with a priority placed on the new connection partner within the number of registered data (N data in the example shown in FIG. 15) in the link table T1 prepared in the nonvolatile memory 75 so as to improve the convenience.

Alternatively, for example, the number of times of access from each device may be stored in the link table T1, and the data of a device with the smallest number of times of access may be deleted.

Instead, the registration time of each device may be stored in the link table T1, and the data of a device with the oldest registration time may be deleted.

If the authentication by the PIN code is successful, connection between the access point 10 and the personal computer 100 is established, and radio data commutation can be performed (step B21). If the authentication by the PIN code fails (No in step B15), the access point 10 rejects connection of the personal computer 100 that requests connection.

On the other hand, if the authentication operation by a PIN code is inhibited (No in step B12) or the personal computer 100 is used to be connected to the access point 10 in the past (No in step B13), the access point 10 executes authentication by a link key (step B22). In this case, when the personal computer 100 that requests connection is used to be connected to the access point 10 in the past, a link key for the personal computer 100 should have been registered in the link table T1, so that the authentication can be executed using the link key. If the authentication is successful (Yes in step B23), the access point 10 establishes connection to the personal computer 100 (step B21). If the authentication by the link key fails (No in step B23), the access point 10 rejects connection of the personal computer 100 that requests connection.

Only when the authentication operation by a PIN code is permitted, a new device can try to access to the access point 10. When the authentication operation by a PIN code is normally inhibited by operating the slide switch 34a, any person other than the authentic user, who acquires the PIN code of the access point 10 by some means, cannot access the access point 10. Hence, any illegal operation such as use of the public line 11 without permission can be prevented.

Even when the manager of the access point 10 forgets to switch the slide switch 34a to the inhibition state, the authentication operation by a PIN code is automatically inhibited after the elapse of a predetermined time independently of the state of the slide switch 34a. For this reason, the security for the access point 10 can be improved.

(c) Security Information Maintenance Processing

Security information maintenance processing will be described below.

Figure 20:
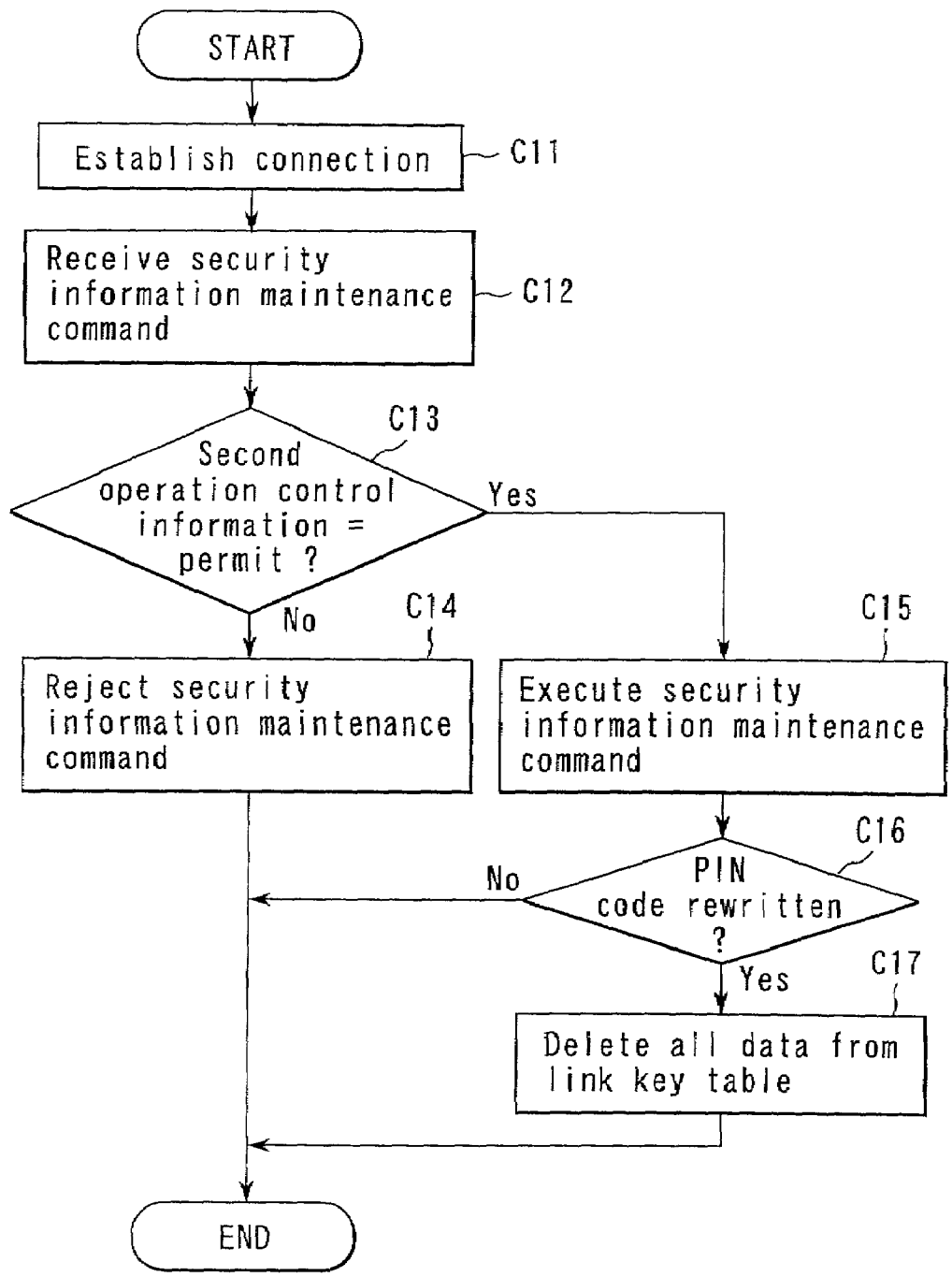
FIG. 20 is a flow chart showing security information maintenance processing in the access point.

FIG. 20 is a flow chart showing security information maintenance processing in the access point 10. FIG. 20 shows the processing of a program executed by the CPU 72 in the access point 10.

After connection to the personal computer 100 as an external device is established (step C11), a security information maintenance command is transmitted from the personal computer 100 by radio. Examples of the security information maintenance command are a read or rewrite of a PIN code, and a read or delete of the link table T1.

Upon receiving the maintenance command, the access point 10 checks on the basis of the second operation control information stored in the second operation control information storage section 74b in the RAM 74 whether the security information maintenance operation is permitted (step C12).

As described above, if the slide switch 34b is switched to the permission state, and a predetermined time has not elapsed yet after the slide switch 34b is switched to the permission state, the second operation control information indicates permission. If the slide switch 34b is switched to the inhibition state, or a predetermined time has elapsed after the slide switch 34b is switched to the permission state, the second operation control information indicates inhibition.

If the security information maintenance operation is inhibited (No in step C13), the access point 10 rejects the maintenance command (step C14). In this case, no external device can execute the security information maintenance.

If the security information maintenance operation is permitted (Yes in step C13), the access point 10 executes the maintenance command (step C15). If the PIN code is rewritten (Yes in step C16), the access point 10 deletes all data in the link table T1 (step C17).

Only when the security information maintenance operation is permitted, a command can be sent from the external device to rewrite the PIN code or the like. When the security information maintenance operation is normally inhibited by operating the slide switch 34b, the security information cannot be accessed without permission, and the security for the access point 10 can be ensured.

Even when the manager of the access point 10 forgets to switch the slide switch 34b to the inhibition state, the security information maintenance operation is automatically inhibited after the elapse of a predetermined time independently of the state of the slide switch 34b. For this reason, the security for the access point 10 can be ensured.

In addition, when the PIN code is changed, all data in the link table T1 are cleared in consideration of the possibility of data alteration by an illicit user, thereby further improving the security. If the link table T1 is cleared, all external devices are requested to input the PIN code again. A user who does not know the PIN code newly set in the access point 10 cannot be connected to the access point 10.

(d) Authentication Error Processing at the Time of Connection

Authentication error processing at the time of connection will be described below.

Figure 21:
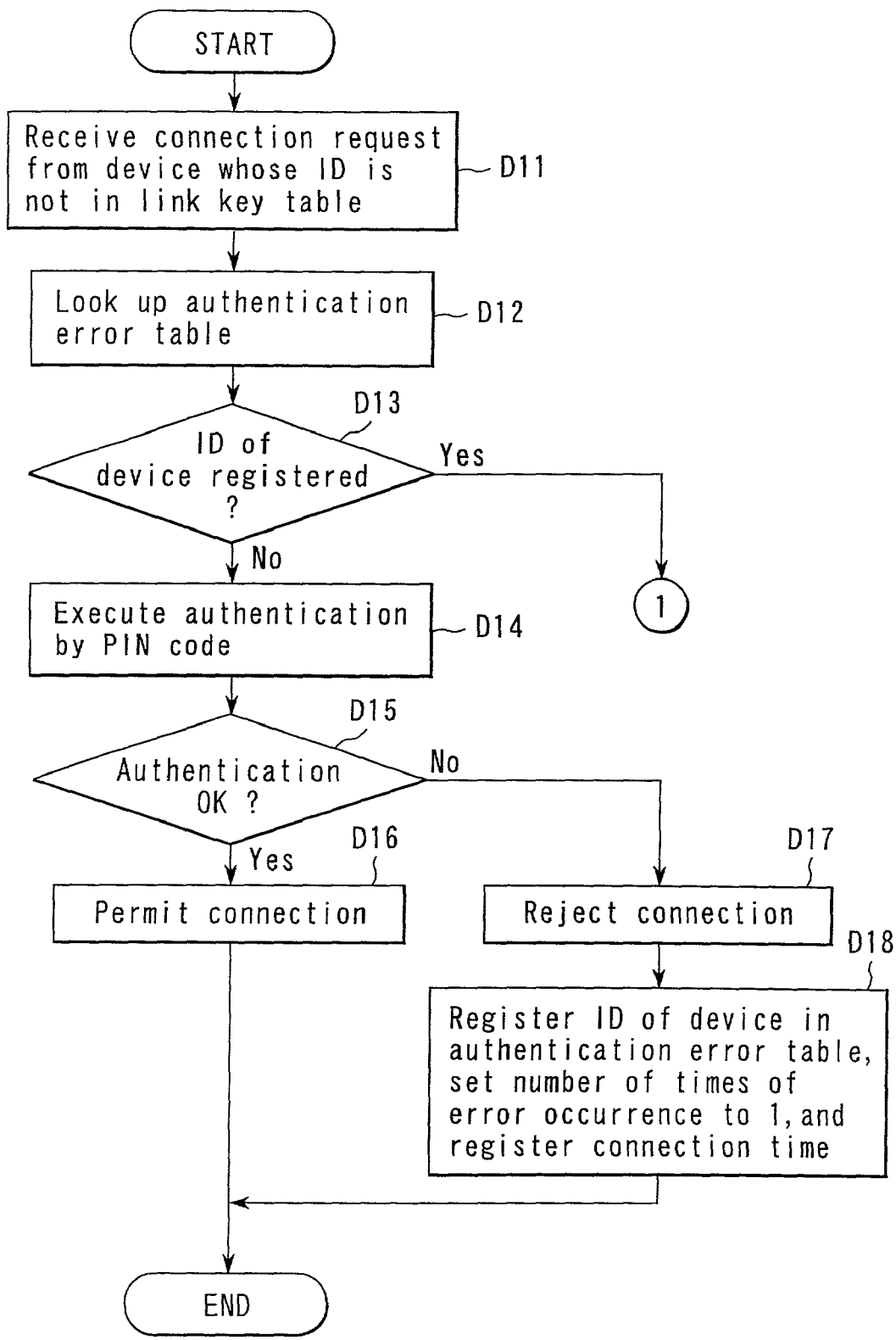
FIG. 21 is a first flow chart showing authentication error processing in the access point at the time of connection.
Figure 22:
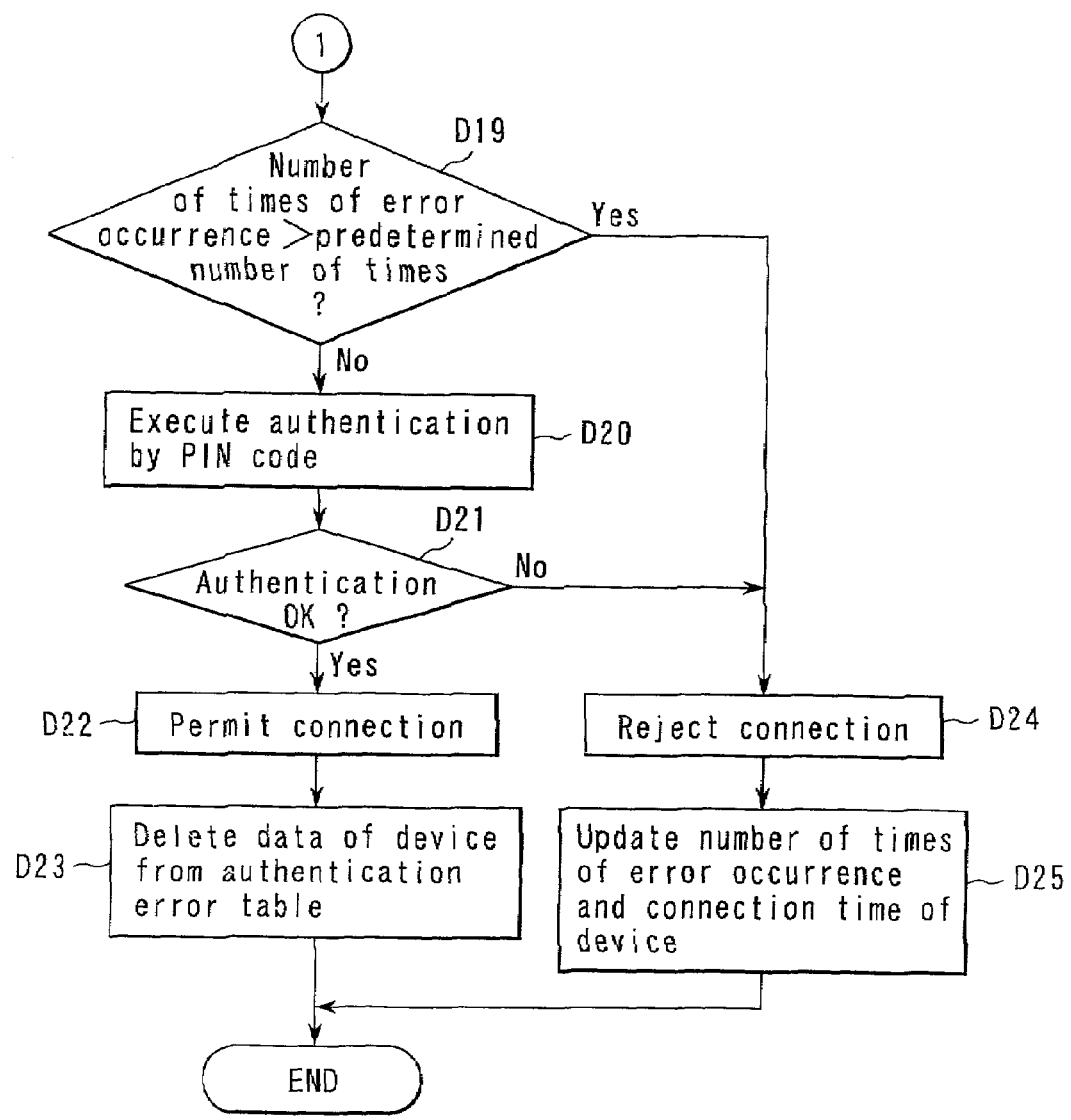
FIG. 22 is a second flow chart showing authentication error processing in the access point at the time of connection.

FIGS. 21 and 22 are flow charts showing authentication error processing in the access point 10 at the time of connection. FIGS. 21 and 22 show the processing of a program executed by the CPU 72 in the access point 10.

Assume that the ID of the personal computer 100 is not registered in the link table T1. When a connection request is received from the personal computer 100 (step D11), the access point 10 looks up the authentication error table T2 (step D12). In the authentication error table T2, the IDs of devices for which the authentication has failed before are registered, as shown in FIG. 16.

If the ID of the personal computer 100 is not registered in the authentication error table T2 (No in step D13), the access point 10 executes authentication by a PIN code as usual (step D14). If the authentication is successful, i.e., if the PIN code input from the personal computer 100 matches the PIN code of the access point 10 (Yes in step D15), the access point 10 permits connection of the personal computer 100 (step D16).

If the authentication fails, i.e., if the PIN code input from the personal computer 100 does not match the PIN code of the access point 10 (No in step D15), the access point 10 rejects connection of the personal computer 100 (step D17). At this time, the access point 10 acquires the ID of the personal computer 100 and registers the ID in the authentication error table T2. In addition, the access point 10 sets the number of times of error occurrence corresponding to the ID to the initial value "1" and also acquires the current time from the RTC circuit 76 and registers the time as the final connection time (step D18).

Assume that it is determined in step D13 that the ID of the personal computer 100 that requests connection is registered in the link table T1. That is, connection has been rejected before because the PIN code input from the personal computer 100 is wrong.

In this case, first, the access point 10 checks whether the number of times of error occurrence corresponding to the ID of the personal computer 100 in the authentication error table T2 exceeds a predetermined number of times (step D19). If the number of times of error occurrence is equal to or smaller than the predetermined number of times (No in step D19), the access point 10 executes authentication by a PIN code as usual (step D20). If the authentication is successful, i.e., if the PIN code input from the personal computer 100 matches the PIN code of the access point 10 (Yes in step D21), the access point 10 permits connection of the personal computer 100 (step D22). At this time, data related to the personal computer 100 is deleted from the authentication error table T2 (step D23).

If the number of times of error occurrence is larger than the predetermined number of times (No in step D19), the access point 10 determines that the personal computer 100 is an illicit user and rejects connection of the personal computer 100 (step D24). At this time, the number of times of error occurrence for the personal computer 100 in the authentication error table T2 is updated, and the current time is acquired from the RTC circuit 76 and the final connection time is updated to the current time (step D25). This also applies to a case wherein the authentication fails in step D21. Connection is rejected, and data related to the personal computer 100 in the authentication error table T2 are updated (steps D24 and D25).

In executing the authentication by a PIN code, the number of times of authentication error occurrence is counted. When the number of times of authentication error occurrence for a single device exceeds a predetermined number of times, connection of that device is rejected. This prevents the single device from inputting a PIN code many times to try to illicitly access the access point 10. For this reason, the security for the access point 10 can be improved.

The predetermined number of times is preferably about 5. However, the number of times may be determined in advance or arbitrarily set by the manager of the access point 10.

If the authentication error table T2 has no capacity to register the data of a new device (all the data ON/OFF flags are ON), device data with the oldest connection time is deleted from the authentication error table T2, and the data of the new device is registered there. When old data is deleted, the numbers of times of authentication error occurrence can be efficiently managed with a priority placed on the new connection partner within the number of registered data (M data in the example shown in FIG. 16) in the authentication error table T2 prepared in the nonvolatile memory 75 so as to improve the convenience.

When the authentication operation by a PIN code or security information maintenance operation is inhibited by operating the switch arranged on the access point 10, any illicit access from the outside can be prevented, and the security can be improved. Even when the manager forgets to switch the switch, the security can be ensured because the authentication operation by a PIN code or security information maintenance operation is automatically switched to the inhibition state after the elapse of a predetermined time independently of the state of the switch.

When an illicit PIN code is input from the same device many times, connection of the device is rejected after that. This prevents a person who does not know the correct PIN code from trying to illicitly access the access point.

To register a new connection partner and link key after the number of registered link keys in the link table T1 prepared in the nonvolatile memory 75 has reached the maximum storable number, an already stored link key is deleted in accordance with a predetermined rule (e.g., in the chronological order of connection time or in ascending order of access frequency), and the new link key is registered in that region. With this processing, PIN code input for the subsequent connection can be omitted with a priority placed on the new connection partner, so the convenience can be improved.

When a PIN code in the access point 10 is changed, all link keys of devices registered in the link table T1 are deleted, and input of a new PIN code is requested at the time of connection, thereby improving the security.

The ID of a BT module is registered in the BT-PC card 20 to be attached to each device. When the BT-PC card 20 is attached to the access point 10, the CPU 72 shown in FIG. 13 stores the ID registered in the BT-PC card 20 in the ID storage section 75a of the nonvolatile memory 75 in the access point 10 as information unique to the device.

When the CPU 72 detects through the connector 60 serving as a PC card interface that the BT-PC card 20 is exchanged, all data in the link table T1 are deleted, and a new link key is generated when a device is connected.

This is because when the BT module (which stores the ID) is an exchangeable unit such as a PC card, a BT module different from that attached to the access point 10 for the first time may be attached due to user's error. A link key is generated on the basis of an ID and the like. Hence, if a link key generated on the basis of an ID before BT module exchange remains, the link key is inconsistent with a link key generated by an ID after BT module exchange, and the access point cannot be connected to an external device. To solve this problem, when the BT module is exchanged, all data currently registered in the link table T1 are deleted, and a new link key is generated when a device is connected.

The present invention is effective for an illicit access by radio from an external device at a place remote from the access point 10. However, the access means to the access point 10 need not always be a radio means. For example, even in a system in which the access point 10 and personal computer 100 shown in FIG. 1 are connected through a communication cable, any illicit access can be prevented using the same method as in the above embodiment.

In the above embodiment, the access point 10 having a function of connecting the public line 11 has been exemplified. However, the method of the present invention can be applied to any other device having a communication function for connecting itself to another device by radio or the like.

The radio communication module used in each device need not always be an exchangeable unit such as a PC card and may be incorporated in a device.

As the radio communication scheme, not only the Bluetooth but also another scheme may be employed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An access point having a communication unit executing authentication by a specific identification code in creating a link to a first device, comprising:
   a switch configured to switch between a first state and a second state;
   an inhibition unit configured to inhibit the authentication of the first device by the specific identification code when the switch is set in the first state, while permitting an authentication of a second device by a link key, the second device having been connected to the access point before; and
   a permission unit configured to permit the authentication of the first device by the specific identification code when the switch is set in the second state.

2. A device according to claim 1, further comprising:
   a time detection unit configured to detect whether a predetermined time has elapsed after the switch is set in the second state; and
   a control unit configured to inhibit the authentication of the first device by the specific identification code when the time detection unit detects that the predetermined time has elapsed after the switch is set in the second state.

3. A connection control method used for an access point having a communication unit which requires authentication by a specific identification code in creating a link to a first device, and a switch configured to switch between a first state and a second state, comprising:
   permitting the authentication of the first device by the specific identification code when the switch is set in the second state; and
   inhibiting the authentication of the first device by the specific identification code when the switch is set in the first state, while permitting an authentication of a second device by a link key, the second device having been connected to the access point before.

4. A method according to claim 3, further comprising:
   determining whether it is detected that a predetermined time has elapsed after the switch is set in the second state; and
   inhibiting the authentication of the first device by the specific identification code when the predetermined time has elapsed after the switch is set in the second state.

* * * * *